United States Patent [19]

Reichenbacher

[11] 3,928,388

[45] Dec. 23, 1975

[54] PREPARATION OF UNSATURATED-HYDROCARBYL COUMARYL ETHERS

[75] Inventor: Paul H. Reichenbacher, Elk Grove Village, Ill.

[73] Assignee: Universal Oil Products Company, Des Plaines, Ill.

[22] Filed: Dec. 20, 1973

[21] Appl. No.: 426,982

[52] U.S. Cl. .......................... 260/343.2; 260/240 R
[51] Int. Cl.² ...................................... C07D 311/16
[58] Field of Search .............................. 260/343.2 R

[56] References Cited
UNITED STATES PATENTS 1,934,361  11/1933  Levinson ........................ 260/343.2
3,707,481  12/1972  Arrigo et al. ................... 260/343.2

*Primary Examiner*—James A. Patten
*Attorney, Agent, or Firm*—James R. Hoatson, Jr.; Raymond H. Nelson; William H. Page, II

[57] ABSTRACT

Unsaturated-hydrocarbyl coumaryl ethers are prepared from the reaction of unsaturated-hydrocarbyl hydroxyaryl ethers with ethylenic compounds in the presence of an atmosphere comprising an oxygen-containing gas and a catalyst system comprising a metal or metal salt independently selected from Group VIII of the Periodic Table.

16 Claims, No Drawings

PREPARATION OF UNSATURATED-HYDROCARBYL COUMARYL ETHERS

This invention relates to a process for preparing unsaturated-hydrocarbyl coumaryl ethers. More specifically, this invention relates to a process for the preparation of unsaturated-hydrocarbyl coumaryl ethers which comprises the reaction of unsaturated-hydrocarbyl hydroxyaryl ethers with ethylenic compounds in the presence of an atmosphere comprising an oxygen-containing gas and a catalyst system comprising a metal or metal salt independently selected from Group VIII of the Periodic Table.

It has been shown in the prior art that hydrocarbyl coumaryl ethers which may be unsaturated may be utilized as sun-screening agents, said unsaturated-hydrocarbyl coumaryl ethers being in accordance with the structure of Formula 1

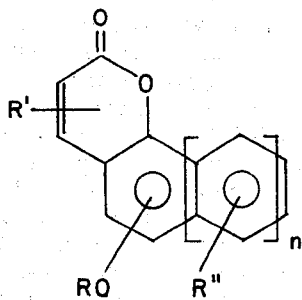

wherein R may be alkenyl, cycloalkenyl, alkadienyl, cycloalkadienyl, alkatrienyl, alkoxyalkadienyl, acyloxyalkadienyl, alkoxyalkenyl, or cyclialkoxyalkenyl, wherein R' is either hydrogen or lower alkyl, and wherein R'' is hydrogen, hydroxyl, alkyl, aryl, alkoxy, alkaryl, aralkyl, or cycloalkyl radical, and where n is an integer ranging from 0 to 2. The prior art discloses a process which comprises the reaction of a 7-hydroxycoumarin or a 7-hydroxy-4-lower-alkylcoumarin with an appropriate halide such as alkenyl chloride, cycloalkenyl chloride, alkadienyl chloride or bromide, cycloalkadienyl chloride or bromide, aralkyl chloride or bromide, alkaryl chloride or bromide, aryl chloride, aryl bromide or aryl iodide, alkatrienyl chloride, alkoxyalkadienyl chloride, acyloxyalkadienyl chloride, alkoxyalkenyl chloride or cyclialkoxyalkenyl chloride in the presence of an alkali metal carbonate or dicarbonate and a catalyst comprising sodium or potassium iodide to prepare the known hydrocarbyl coumaryl ethers which are unsaturated. The prior art discloses that said process may be effected at atmospheric pressure, reflux temperature conditions and for a period of time which may vary from about 10 hours up to about 30 hours or more. It is also shown that the hydrocarbyl coumaryl ether which is unsaturated may be separated from the reaction media by means of crystallization or distillation.

In contradistinction to the prior art it has now been discovered that unsaturated-hydrocarbyl coumaryl ethers may be prepared from the reaction of an unsaturated-hydrocarbyl hydroxyaryl ether with an ethylenic compound in the presence of an atmosphere comprising an oxygen-containing gas and a catalyst system comprising a metal or metal salt independently selected from Group VIII of the Periodic Table. The utilization of the above set forth process will allow the manufacturer to prepare the desired unsaturated-hydrocarbyl coumaryl ethers in a more economically feasible manner as a result of the elimination of using any corrosive halide compounds such as chlorides, bromides, or iodides which are difficult to handle and require specially lined vessels. The above set forth invention will also allow the manufacturer to produce a greater percentage conversion of the initial reactants in a smaller increment of time as a result of the novel catalyst system and the fact that the increase in temperature or pressures required for a desired product will not effect the time of reaction or percentage of conversion of the reactants. The desired products of the present invention may be separated from the reaction media in a better and more efficient means than crystallization or distillation, said means contemplated within the scope of this invention would include crystallization and distillation as well as other means of separation such as extraction, washing, drying, or evaporation.

The desired products of the process of this invention, namely, unsaturated-hydrocarbyl coumaryl ethers, are utilized in the chemical industry in many ways. For example, a mixture of 4-methyl-6-(8-geranyloxy)-coumarin and 4-methyl-6-(8-neryloxy)-coumarin may be utilized as a colorless, stable, odorless, non-irritating, non-sensitizing, and oil-compatible, sun-screening composition. Likewise, other unsaturated-hydrocarbyl coumaryl ethers may be utilized in the preparation of aroma chemicals, said aroma compositions being used as cosmetics and toiletries, perfumes, colognes, soaps, talcs, bath powders, etc.

It is therefore an object of this invention to provide a process for the preparation of unsaturated-hydrocarbyl coumaryl ethers.

A further object of this invention is to provide a process for the preparation of the unsaturated-hydrocarbyl coumaryl ethers utilizing certain reactants and catalyst systems which will permit recovery of the desired compound in a more expedient manner.

In one aspect an embodiment of this invention resides in a process for the preparation of an unsaturated-hydrocarbyl coumaryl ether which comprises the reaction of an unsaturated-hydrocarbyl hydroxyaryl ether with an ethylenic compound in the presence of an atmosphere comprising an oxygen-containing gas and a catalyst system comprising a metal or metal salts independently selected from Group VIII of the Periodic Table at reaction conditions, and recovering the resultant unsaturated-hydrocarbyl coumaryl ether.

A specific embodiment of this invention resides in a process for preparing an unsaturated-hydrocarbyl coumaryl ether which comprises reacting 8-geranyl 4-hydroxyphenyl ether with methyl crotonate in the presence of oxygen and a catalyst comprising palladium acetylacetonate in a reaction media of acetic acid at a temperature in the range of from about 75°C. to about 125°C. and a pressure of from about 1 atmosphere to about 10 atmospheres, and recovering the resultant unsaturated-hydrocarbyl coumaryl ether, namely, 4-methyl-6-(8-geranyloxy)-coumarin.

A second specific embodiment of this invention resides in a process for preparing an unsaturated-hydrocarbyl coumarin ether which comprises the reaction of 8-neryl 4-hydroxyphenyl ether with crotonic acid in the presence of oxygen and palladium in a media of propionic acid at a temperature of 150°C. and a pressure of 5 atmospheres and recovering the resultant unsaturated-hydrocarbyl coumaryl ether, namely, 4-methyl-6-

(8-neryloxy)-coumarin.

Yet another specific embodiment of this invention resides in a process for preparing an unsaturated-hydrocarbyl coumaryl ether which comprises the reaction of 4-prenyloxyphenol with methyl crotonate in the presence of oxygen, palladium acetate, and copper acetate in a media comprising acetic acid at a temperature of 200°C. and a pressure of 50 atmospheres, and recovering the resultant unsaturated-hydrocarbyl coumaryl ether, namely, 4-methyl-6-prenyloxycoumarin.

Other objects and embodiments will be found in the following detailed description of the present invention.

Examples of unsaturated-hydrocarbyl coumaryl ethers which may be prepared according to the process of this invention will include vinyl coumaryl ether, as exemplified by Formula 2,

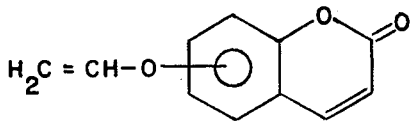

or 4-methyl-6-(8-geranyloxy)-coumarin, as exemplified by Formula 3,

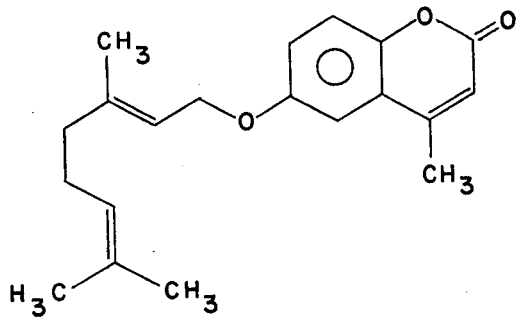

or 4-methyl-6-(8-neryloxy)-coumarin, as exemplified by Formula 4,

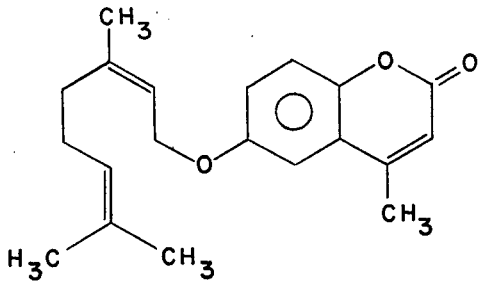

or 4-methyl-6-prenyloxycoumarin, as exemplified by Formula 5,

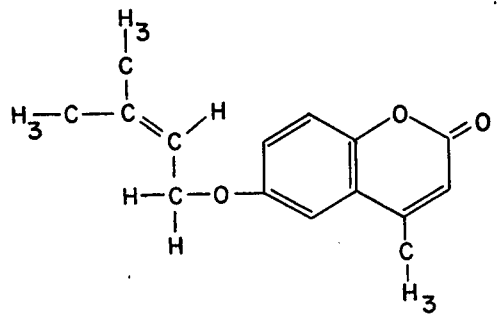

Other suitable unsaturated-hydrocarbyl coumaryl ethers may be exemplified by 7-allyloxy-4-methyl-coumarin, 6-(3-methyl-2-buten-1-oxy)-4-ethylcoumarin, 6-neryloxy-4-butylcoumarin, 6-geranyloxy-4-n-propylcoumarin, 6-geranyloxy-4-sec-butylcoumarin, 6-(3-methylcyclohex-2-en-1-oxy)-4-methylcoumarin, etc.

As hereinbefore set forth, the present invention is concerned with a process for preparing unsaturated-hydrocarbyl coumaryl ethers, said process being effected by reacting unsaturated-hydrocarbyl hydroxyaryl ethers with ethylenic compounds in the presence of an atmosphere comprising an oxygen-containing gas and a catalyst system comprising a metal or metal salt independently selected from Group VIII of the Periodic Table. The reaction is effected under conditions which include an elevated temperature in the range of from about 25°C. to about 250°C. and preferably in a range of from about 50°C. to about 175°C. In addition, another reaction condition involves pressures, said pressures ranging from about atmospheric up to about 100 atmospheres or more. When an atmospheric pressure is utilized in the above set forth invention the presence of the oxygen-containing gas may be effected by an atmospheric reaction environment in which the oxygen-containing gas is bubbled up from the bottom of the reaction media to the top. When superatmospheric pressures are employed said pressure may be effected by the presence of the oxygen-containing gas or, if desired, additional pressure may be effected by the entry of a substantially inert gas such as nitrogen or helium into the reaction zone in conjunction with the oxygen-containing gas. Another variable which is employed is the amount of reactants, the unsaturated-hydrocarbyl hydroxyaryl ether usually being present in a mole ratio in the range of from about 1:1 up to about 5:1 moles of unsaturated-hydrocarbyl hydroxyaryl ether per mole of ethylenic compound.

Examples of suitable unsaturated-hydrocarbyl hydroxyaryl ethers which are utilized as one of the starting materials in the process of this invention include in particular all unsaturated-hydrocarbyl hydroxyaryl ethers in accordance with the generic Formula 6,

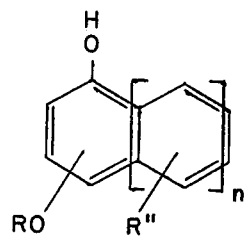

wherein R is alkenyl, cycloalkenyl, alkadienyl, cycloalkadienyl, alkatrienyl, alkoxyalkadienyl, acyloxyalkadienyl, alkoxyalkenyl or cyclialkoxyalkenyl, wherein R'' is a hydrogen, hydroxyl, alkyl, aryl, alkoxy, alkaryl, aralkyl, or cycloalkyl radical, and where n is an integer ranging from 0 to 2. Said unsaturated-hydrocarbyl hydroxyaryl ethers would include vinyl hydroxyphenyl ether, 8-geranyl 4-hydroxphenyl ether, 8-neryl 4-hydroxyphenyl ether, prenyl 3-hydroxyphenyl ether, 2α-(2-propenyl)-5β-methyl-β-cyclohexanyl 4-hydroxyphenyl ether (commonly named as isopulegyl 4-hydroxyphenyl ether, 2β-(2-propenyl)-5α-methyl-β-cyclohexanyl 2-hydroxyphenyl ether (commonly named as neoisopulegyl 2-hydroxyphenyl ether), 3,7-dimethyl-6-octen-1-yl 4-hydroxyphenyl ether (commonly named as citronellyl 4-hydroxyphenyl ether), etc.

Examples of suitable ethylenic compounds which may be reacted with the aforementioned unsaturated-hydrocarbyl hydroxyaryl ethers will include all ethylenic compounds in accordance with Formula 7,

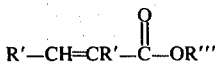

wherein each R' is independently selected from hydrogen or a lower alkyl radical and wherein R''' is equal to a hydrogen, alkyl, aryl, cycloalkyl, aralkyl, or alkaryl radical. Said ethylenic compound may be exemplified by acrylic acid, methyl acrylate, ethyl acrylate, propyl acrylate, butyl acrylate, crotonic acid, methyl crotonate, ethyl crotonate, propyl crotonate, butyl crotonate, amyl crotonate, methacrylic acid, methyl methacrylate, ethyl methacrylate, butyl methacrylate, 2-pentenoic acid, methyl 2-pentenoate, ethyl 2-pentenoate, amyl 2-pentenoate, 2-ethylacrylic acid, methyl 2-ethylacrylate, ethyl 2-ethylacrylate, etc.

In one embodiment of the present invention, it is contemplated that the reaction is effected in a catalytic manner. The catalytic compositions of matter comprise a catalyst system of a metal or metal salt independently selected from Group VIII of the Periodic Table. Such metals or metal salts selected from Group VIII of the Periodic Table may be exemplified by iron, cobalt, nickel, ruthenium, rhodium, palladium, osmium, iridium, platinum, palladium acetate, palladium acetylacetonate, platinum acetate, platinum acetylacetonate, ruthenium acetate, rhodium acetate, iridium acetate, nickel acetate, iron acetylacetonate, cobalt acetylacetonate, osmium acetylacetonate, etc. In a preferred embodiment of the present invention, it is contemplated that the reaction may be effected in the presence of a catalytic system which will also comprise a metal or metal salt selected from the transition series of the Periodic Table in conjunction with the metal or metal salt independently selected from Group VIII of the Periodic Table. The term transition series of the Periodic Table as herein used is defined as all groups ending with B within the Periodic Table such as IVB, VB, VIB, VIIB, IB, and IIB. Suitable examples of transition series metals or metal salts which may be utilized within the present invention include titanium, vanadium, scandium, zirconium, hafnium, chromium, molybdenum, tungsten, technetium, manganese, rhenium, copper, silver, gold, zinc, cadmium, mercury, scandium acetate, zirconium acetate, hafnium acetate, vanadium acetylacetonate, vanadium acetate, tantalum acetylacetonate, tungsten acetate, molybdenum acetate, chromium acetylacetonate, manganese acetate, technetium acetylacetonate, rhenium acetylacetonate, copper acetate, copper acetylacetonate, silver acetate, silver acetylacetonate, gold acetate, gold acetylacetonate, zinc acetate, cadmium acetate, cadmium acetylacetonate, mercury acetate, mercury acetylacetonate, etc.

In another embodiment of the present invention, it is contemplated that the reaction of the unsaturated-hydrocarbyl hydroxyaryl ether with the ethylenic compound in the presence of an atmosphere comprising an oxygen-containing gas and a catalytic system comprising a metal or metal salt independently selected from Group VIII of the Periodic Table and, if so desired, a metal or metal salt from the transition series may be effected in a medium comprising a lower aliphatic carboxylic acid, said lower aliphatic carboxylic acid having a carbon number range of from about 1 to about 5. Examples of suitable lower aliphatic carboxylic acids would include formic acid, acetic acid, propionic acid, butyric acid, valeric acid, etc.

It is understood that the aforementioned unsaturated-hydrocarbyl coumaryl ethers, unsaturated-hydrocarbyl hydroxyaryl ethers, ethylenic compounds, metal or metal salts selected from Group VIII of the Periodic Table, metal or metal salts selected from the Transition Series of the Periodic Table, and lower aliphatic carboxylic acid mediums are only representative of the classes of compounds which may be employed and that the present invention is not necessarily limited thereto.

The process of this invention may be effected in any suitable manner and may comprise either a batch or continuous type of operation. For example, when a batch type of operation is used a quantity of the unsaturated-hydrocarbyl hydroxyaryl ether and the ethylenic compound are placed in an appropriate apparatus along with a metal or metal salt independently selected from Group VIII of the Periodic Table as hereinbefore set forth. In addition, if so desired, a lower aliphatic carboxylic acid such as acetic acid and a catalyst comprising a transition metal or salt thereof as hereinbefore defined may also be present in the apparatus. This apparatus may, in a preferred embodiment of the invention, comprise an autoclave of the rotating or mixing type. The apparatus is sealed, the oxygen-containing gas is charged thereto and the apparatus is then heated to the desired temperature and pressure for a predetermined residence time which may range from 0.5 up to 48 hours or more in duration, heating is discontinued. The apparatus and contents thereof are allowed to return to room temperature, the excess pressure is vented, and the reaction product is removed. The product is then subjected to conventional means of separation and purification such as crystallization, distillation, extraction, washing, drying, or evaporation whereby the desired unsaturated-hydrocarbyl coumaryl ether is recovered.

The following examples are given to illustrate the process of this invention, which however are not intended to limit the generally broad scope of the present invention in strict accordance therewith.

EXAMPLE I

In this example 2.0 moles of 8-geranyl 4-hydroxyphenyl ether and 2.0 moles of methyl crotonate are placed in a rotating autoclave containing 0.1 mole of palladium acetylacetonate and 100 grams of acetic acid, said autoclave being equipped with heating and oxygen attainment devices. The autoclave is heated to a temperature of 100°C. and maintained thereat for a period of time comprising 2 hours under an oxygen pressure of 5 atmospheres. At the end of this time, mixing, heating, and oxygen flow are discontinued, and the autoclave is allowed to return to room temperature and ambient pressure after venting. The reaction product is separated from the bulk of the unreacted starting material and acetic acid and subsequently isolated on a preparative gas chromatograph. Analysis by mass spectrometer shows a parent peak corresponding to 4-methyl-6-(8-geranyloxy)-coumarin.

EXAMPLE II

In this example 1.0 moles of 8-neryl 4-hydroxyphenyl ether and 1.0 mole of crotonic acid are placed in an autoclave containing 0.25 mole of palladium and 75.0 grams of propionic acid, said autoclave being equipped with stirring, heating and oxygen attainment devices. The autoclave is heated to a temperature of 150°C. and maintained thereat for a period of time comprising 4 hours under an oxygen pressure of 15 atmospheres. At the end of this time, stirring, heating, and oxygen entry are terminated, and the autoclave is allowed to return to room temperature and ambient pressure after venting. The reaction product is separated from the bulk of the unreacted starting materials and propionic acid and subsequently isolated on a preparative gas chromatograph. Analysis by mass spectrometer shows a parent ion peak corresponding to 4-methyl-6-(8-neryloxy)-coumarin.

EXAMPLE III

In this example 2.0 moles of prenyl 3-hydroxyphenyl ether and 1.0 mole of methyl methacrylate are added to an autoclave containing 0.1 gram of palladium acetate, 0.5 gram of copper acetate, and 150.0 grams of acetic acid, said autoclave being equipped with stirring, heating and oxygen entry devices. The autoclave is heated to a temperature of 200°C. and maintained thereat for a period of time comprising 15 hours under an oxygen pressure of 50 atmospheres. At the end of this time, stirring, heating, and oxygen entry are terminated, and the autoclave is allowed to return to room temperature and ambient pressure after venting. The reaction product is separated from the bulk of the unreacted starting materials, and acetic acid and subsequently isolated on a preparative gas chromatograph. Analysis by mass spectrometer shows a parent ion peak corresponding to 3-methyl-7-prenyloxycoumarin.

EXAMPLE IV

In this example, 2.0 moles of vinyl 2-hydroxyphenyl ether and 1.0 mole of methyl acrylate are added to a rocking autoclave containing 0.25 gram of palladium, 0.15 gram of cupric acetylacetonate, 0.3 gram of silver propionate, and 100.0 grams of propionic acid, said autoclave being equipped with heating and oxygen attainment devices. The rocking autoclave is heated to a temperature of 225°C. and maintained thereat for a period of time comprising 24 hours under an oxygen pressure of 100 atmospheres. At the end of this time, mixing, heating, and oxygen entry are terminated, and the autoclave allowed to return to room temperature and ambient pressure after venting. The reaction product was separated from the bulk of the unreacted starting materials and propionic acid and subsequently isolated on a preparative gas chromatograph. Analysis by mass spectrometer shows a parent peak corresponding to 8-vinyloxycoumarin.

I claim as my invention:

1. A process for the preparation of an ethylenically unsaturated-hydrocarbyl coumaryl-ether which comprises reacting an ethylenically unsaturated-hydrocarbyl hydroxyaryl ether with an ethylenic compound in the presence of an atmosphere comprising an oxygen-containing gas and a catalyst system consisting essentially of a metal or metal salt independently selected from Group VIII of the Periodic Table optionally in the presence of a metal or metal salt selected from the Transition Series of the Periodic Table at reaction conditions, and recovering the resultant ethylenically unsaturated-hydrocarbyl coumaryl ether.

2. The process of claim 1 further characterized in that the reaction conditions include a temperature of from about 25°C. to about 250°C. and a pressure of from about 1 atmosphere to about 500 atmospheres.

3. The process of claim 1 further characterized in that the catalyst system includes a metal or metal salt selected from the Transition Series of the Periodic Table.

4. The process of claim 3 further characterized in that the metal salt selected from the Transition Series of the Periodic Table is copper acetate.

5. The process of claim 3 further characterized in that the metal salt selected from the Transition Series of the Periodic Table is cupric acetylacetonate.

6. The process of claim 3 further characterized in that the metal salt selected from the Transition Series of the Periodic Table is silver acetate.

7. The process of claim 1 further characterized in that the salt of the Group VIII metal is platinum acetylacetonate.

8. The process of claim 1 further characterized in that the salt of the Group VIII metal is palladium acetate.

9. The process of claim 1 further characterized in that the Group VIII metal is palladium.

10. The process of claim 1 further characterized in that the reaction is effected in a media comprising a lower aliphatic carboxylic acid.

11. The process of claim 10 further characterized in that the lower carboxylic acid is acetic acid.

12. The process of claim 10 further characterized in that the lower alkyl carboxylic acid is propionic acid.

13. The process of claim 1 further characterized in that the ethylenically unsaturated-hydrocarbyl hydroxyaryl ether is vinyl 2-hydroxyphenyl, the ethylenic compound is methyl acrylate and the resultant ethylenically unsaturated-hydrocarbyl coumaryl ether is 8-vinyloxycoumarin.

14. The process of claim 1 further characterized in that the ethylenically unsaturated-hydrocarbyl hydroxyaryl ether is 8-geranyl 4-hydroxyphenyl ether, the ethylenic compound is methyl crotonate and the resultant ethylenically unsaturated-hydrocarbyl coumaryl ether is 4-methyl-6-(8-geranyloxy)-coumarin.

15. The process of claim 1 further characterized in that the ethylenically unsaturated-hydrocarbyl hydroxyaryl ether is 8-neryl 4-hydroxyphenyl ether, the ethylenic compound is crotonic acid and the resultant ethylenically unsaturated-hydrocarbyl coumaryl ether is 4-methyl -6-(8-neryloxy)-coumarin.

16. The process of claim 1 further characterized in that the ethylenically unsaturated-hydrocarbyl hydroxyaryl ether is prenyl 3-hydroxyphenyl ether, the ethylenic compound is methyl methacrylate and the resultant ethylenically unsaturated-hydrocarbyl coumaryl ether is 3-methyl-7-prenyloxycoumarin.

* * * * *